April 27, 1926.  1,582,477
T. LAFITTE
STEERING ARRANGEMENT FOR LIGHT MOTOR VEHICLES
Filed Sept. 15, 1924   3 Sheets-Sheet 1
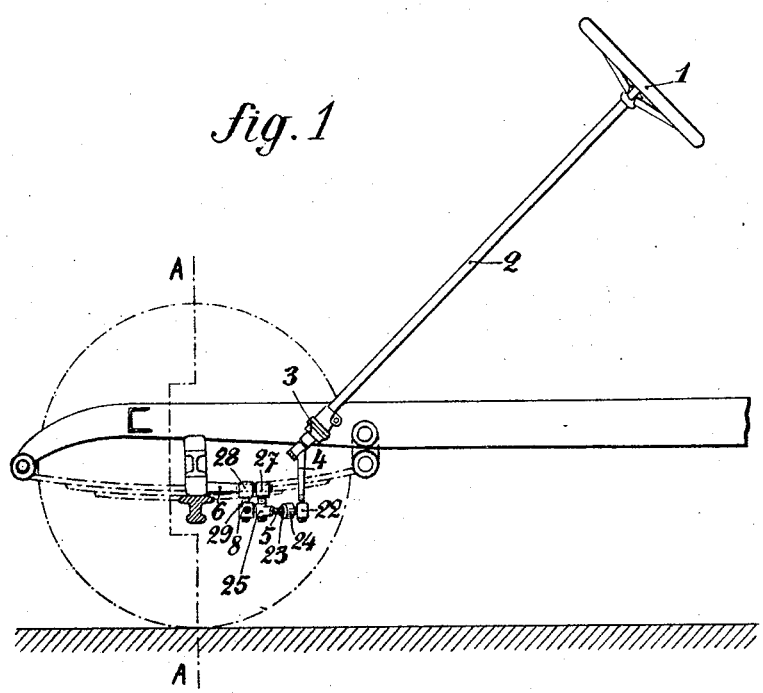
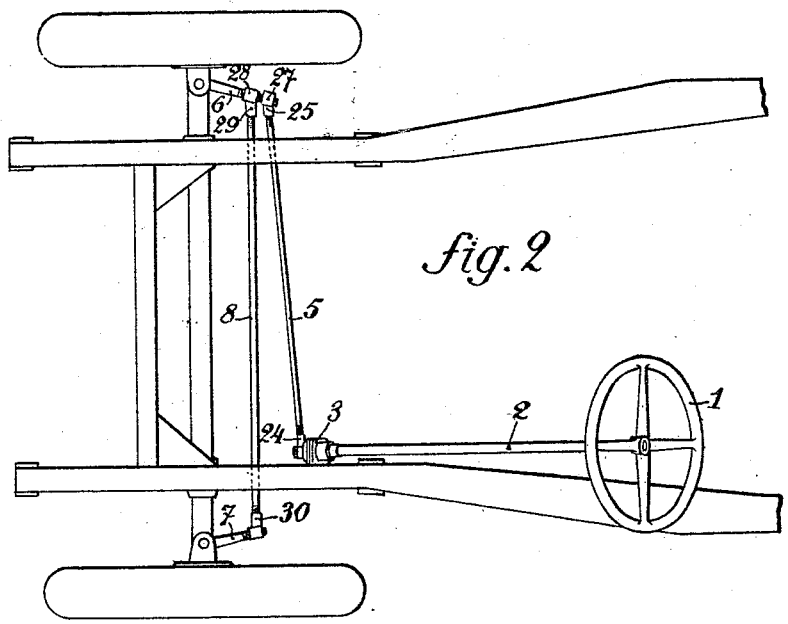

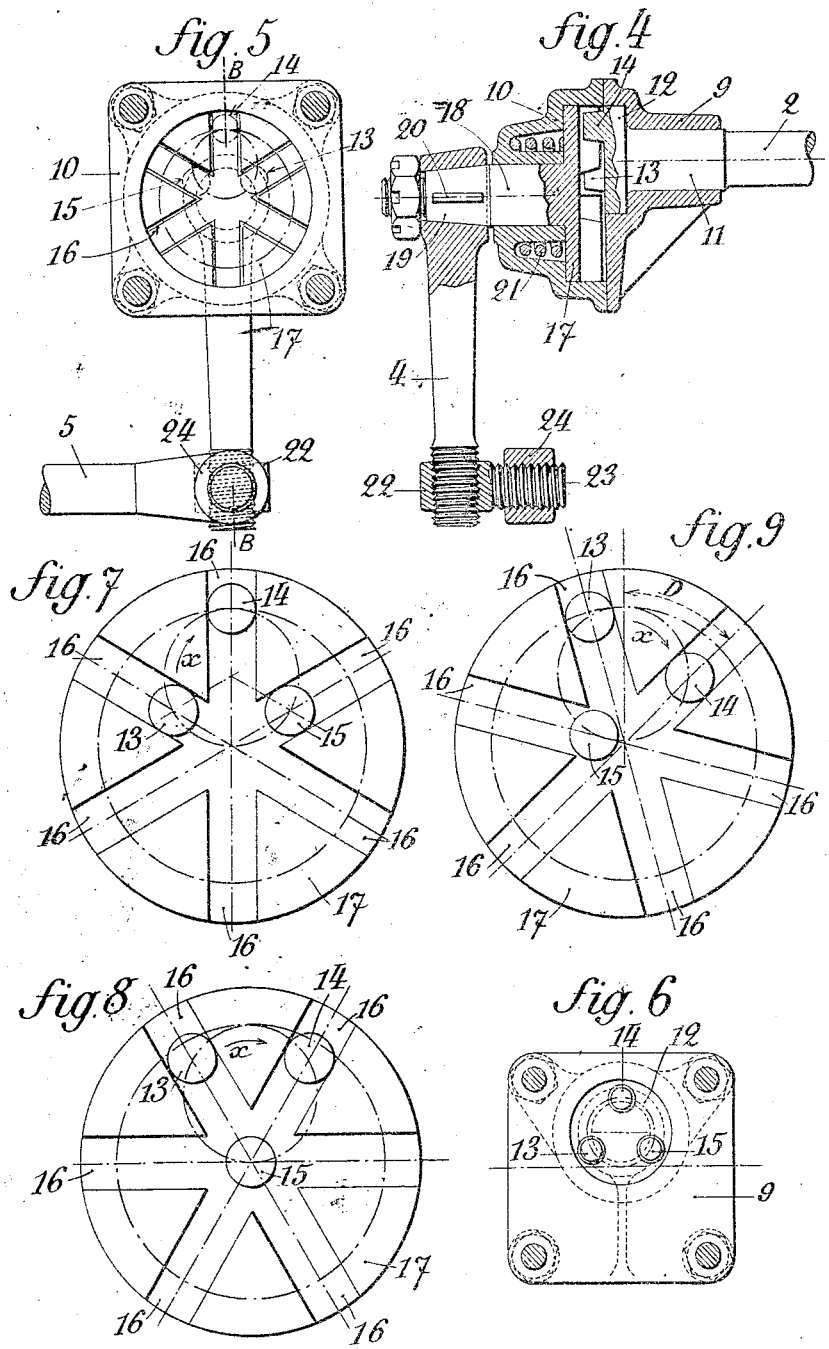

April 27, 1926. 1,582,477
T. LAFITTE
STEERING ARRANGEMENT FOR LIGHT MOTOR VEHICLES
Filed Sept. 15, 1924 3 Sheets-Sheet 3
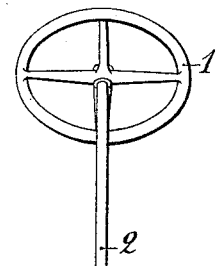
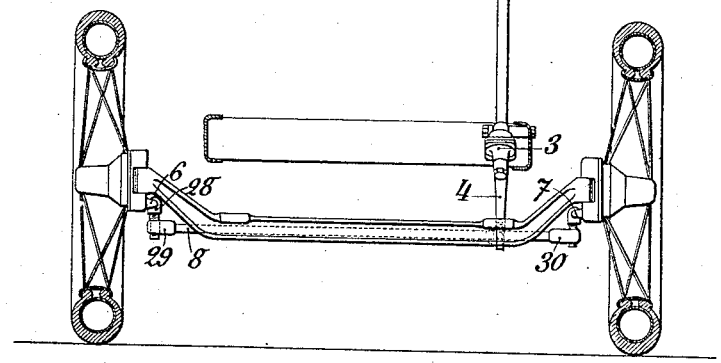
fig. 3
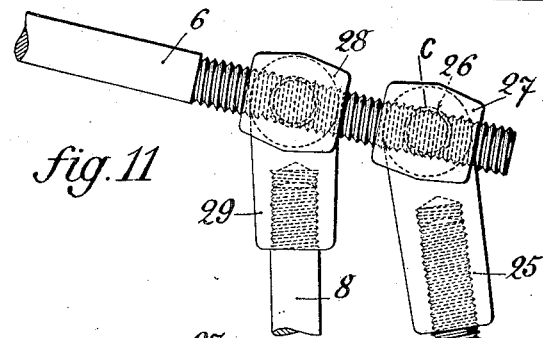
fig. 11
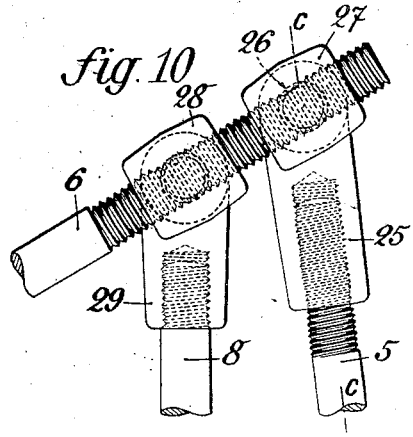
fig. 10
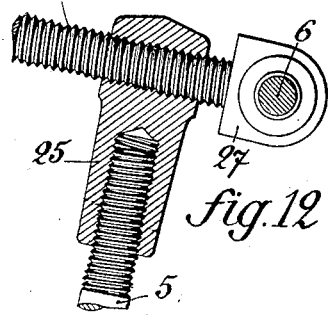
fig. 12
Inventor
T. Lafitte Patented Apr. 27, 1926.

1,582,477

UNITED STATES PATENT OFFICE.

THÉODORE LAFITTE, OF PARIS, FRANCE.

STEERING ARRANGEMENT FOR LIGHT MOTOR VEHICLES.

Application filed September 15, 1924. Serial No. 737,927.

*To all whom it may concern:*

Be it known that I, THÉODORE LAFITTE, a citizen of the Republic of France, and residing at Paris, Seine Department, No. 15 Avenue Pasteur, in the Republic of France, have invented certain new and useful Steering Arrangements for Light Motor Vehicles, of which the following is a specification.

The present invention relates to a steering arrangement whereof the speed-reduction box is so constructed as to provide for a sufficient reduction ratio for a light motor vehicle, by means of an arrangement which is simple, inexpensive, and adapted to eliminate all play in the steering gear. On the other hand, the several elements such as bars, and levers are connected together by means of fluidtight universal connections which do not require the use of pins and are not subject to disengagement when in operation, the same being so constructed that all play will be eliminated.

The appended drawings which are given by way of example represent a constructional form of steering gear according to the invention.

Fig. 1 is an elevational view of the said steering gear mounted upon a vehicle frame which is diagrammatically represented, partly in section.

Fig. 2 is a corresponding plan view.

Fig. 3 is a front elevational view of the said steering gear, the vehicle frame being shown in section on the line A—A of Fig. 1.

Fig. 4 is a longitudinal section on a larger scale of the speed-reduction box, on the line B—B of Fig. 5.

Fig. 5 is a plan view of the said box, with the top cover, the driving shaft, and the disc thereof removed.

Fig. 6 is a plan view of the said box, the lower cover and the disc contained therein being removed.

Figs. 7, 8 and 9 are diagrammatic views illustrating the operation of the speed reduction box.

Figs. 10, 11 and 12 represent various details on a larger scale, showing the connections between the several elements.

The steering arrangement comprises a hand wheel 1 keyed to the end of the steering shaft 2 whereof the other end enters the speed-reduction box 3 which is secured to one of the side beams of the vehicle frame. The said box, whose construction and operation will be further described, reduces the speed (in a given ratio) of the movement imparted to the hand wheel, and imparts the same to a lever 4 actuating a steering bar 5; said bar is connected with a coupling lever 6 upon which is also mounted a connecting bar 8 whereof the other end is connected with a second coupling lever 7.

The speed-reduction box 3 comprises two parts or covers, the upper cover 9 and the lower cover 10, Fig. 4; which are bolted together. The shaft 2 which is provided with a shoulder 11 at the end disposed within the box 3, is terminated by a disc 12 situated in a recess formed in the cover 9. The said disc and the shoulder 11 are journalled with moderate friction and without play in the cover 9. Upon the disc 12 and integral therewith are disposed upon a circumference and with 120° spacing, three tapered nibs 13, 14 and 15. The latter are engaged in the slots 16 which have inclined walls and are formed according to diameters in a second disc 17 which is also revoluble with moderate friction and without play in a corresponding recess in the lower cover 10. The cross section of the slots 16 corresponds exactly to the taper of the said nibs.

The recesses in the covers 9 and 10 containing the respective discs 12 and 17 are not situated upon a common centre line, but are in the eccentric position by a quantity which is exactly equal to the radius of the circumference upon which the three tapered nibs are situated. The disc 17 is mounted upon a shaft 18 which is journalled with moderate friction and without play in a bored-out portion of the cover 10 and which terminates in a tapered portion 19 which is screw-threaded at the end. The steering lever 4 is fitted and also keyed at 20 upon the tapered portion 19, and a slotted nut screwed to the said screwthreaded part is secured to the latter by a pin in order to maintain the lever 4 in position. A spring 21 disposed in a recess in the cover 10 constantly urges the disc 17 and maintains the contact at all times between the slots 16 and the tapered nibs of the disc 12.

For the sake of simplicity, it will be understood in the following description that all the tapped parts engaging the screw-threaded portions are to be fitted with moderate friction and without play. The outer end of the lever 4 is provided with a screw-thread which is disengaged at each end and upon which is screwed a member 22 provided with an aperture and with a screw-threaded shank 23; upon the latter is screwed a tapped portion which is formed upon one end of the steering bar 5, the other end of said bar being screwthreaded in order to engage a tapped member 25, Figs. 10 to 12. At the outer end of the latter is disposed a screw threaded rod 26 engaging a tapped hole which is perpendicular to the hole engaging the end of the bar 5; the rod 26 is secured to a screwthreaded fork 27 which is screwed to the end of the lever 6, this arrangement being shown in Fig. 12, which is a section on the line C—C of Figs. 10 and 11.

Before mounting the fork 27 upon the lever 6, a like fork 28 is disposed thereon, whose screwthreaded shank is screwed into a connecting member 29 into which is screwed the end of the coupling bar 8. The arrangement of the bar 8 upon the other connecting lever 7 is similar except that the said bar is not revoluble upon the member 30—similar to 29—connecting the same with the lever 7.

The operation of the said speed-reduction box depends upon La Hire's theorem.

It is observed that according to this theorem, when a circumference, whose diameter is equal to the radius of another circumference, is caused to roll upon this latter, a given point upon the small circumference will describe a diameter of the second. Further, the small circumference will make two revolutions before returning to the starting point. Inversely, if the small circumference is rotated, while obliging a given point thereupon to proceed upon a diameter of the large circumference, this latter being left free to move, the necessary result will be a rotation of the large circumference. Further, when the small circumference makes two revolutions, the large circumference will make one revolution.

The speed-reduction box pertaining to the steering arrangement according to the invention is a direct application of this reciprocal movement. As above stated, the shafts of the discs 12 and 17 are placed in the eccentric position by a quantity equal to the radius of the circumference comprising the nibs 13, 14 and 15.

Supposing that the nibs are in the position shown in Figs. 6 and 7, in which they are engaged in the slots 16; if the shaft 2 is rotated in the direction of the arrow a, Fig. 7, the nibs 13 and 14 will actuate the disc 17 whilst the nib 15 will proceed through the disengaged centre of the said disc (Fig. 8) in order to attain the position shown in Fig. 9. If the disc 12 is turned through an angle D, the disc 17 will have rotated through an angle $\frac{D}{2}$. Continuing the rotation of the shaft 2 in the same direction, the device will still be actuated, since the nib 15 remains in its slot and the nib 13 in the corresponding slot, whilst the nib 14 is gradually disengaged from the slot with which it co-operates.

It should be observed that irrespectively of the respective positions of the two discs, at least two of the nibs will be engaged in the said slots. But if the slots had vertical walls and if the nibs were cylindrical, the wear occasioned by friction would rapidly produce a certain play between the nibs and the slots, and in order to obviate this drawback the slots have been made oblique and the said nibs have been given a conical shape. Any play which might be produced in spite of these conditions can be taken up by means of the spring 21.

As a general rule, a steering device should possess a speed reduction ratio of $\frac{1}{6}$ to $\frac{1}{8}$ between the movement of the hand wheel and the movement which is imparted to the vehicle wheels. The ratio which is obtained with the present steering arrangement is $\frac{1}{2}$, as above mentioned, and this ratio will suffice as a rule for light vehicles. However, should it prove necessary, the gear ratio may be increased by lengthening the actuated lever and shortening the actuating lever. For example, the length of the actuating lever is one-half the length of the actuated lever; the total reduction ratio between the hand wheel and the vehicle wheels is $\frac{1}{2} \times \frac{1}{2} = \frac{1}{4}$.

This particular point concerning the steering arrangement having been properly set forth, the operating conditions of the several controls and the special arrangement of their connections are to be further specified.

When the lever 4 rotates with the disc 17, it draws forward the member 22 which in turn actuates the bar 5 by means of its aperture 24, inasmuch as the angle formed in space by the lever 4 and the bar 5 varies in three steering planes perpendicular to each other, their junction, though rigid, must be effected on the universal principle. This condition is realized from the fact that firstly the device can be rotated in the horizontal plane by reason of the rotation of the aperture 22 upon the lever 4; secondly, the device can be rotated in the vertical plane with respect to the extremity thereof by reason of the rotation of the aperture 22, thirdly, the device can be rotated in the vertical plane of projection by reason of the rotation of the bar 5 in the member 25.

It should be observed that the amplitudes of rotation will in no wise attain the complete circumference so that if care is taken to engage the coupling members by more than one screwthread, the latter can never become unscrewed. To prove this point, if the case of the steering bar 5 is considered, it is observed that the said bar cannot rotate or become unscrewed from the coupling member 25 since it is maintained by the shank 23 of the apertured member 22, which latter is maintained approximately in the horizontal position by the lever 4. The coupling bar 8, which serves to connect the reciprocal movement of the two wheels, is arranged in like manner, and the member 29 is screwed upon the same screwthreaded portion of the lever 6 as the member 25.

The above-described connections are of an economical nature inasmuch as their construction requires only the formation of screwthreads, which is easily carried out. On the other hand, when in operation, even if the said connections are not protected, the screwthreads which are engaged will never be uncovered, since the longitudinal movement of an aperture upon its corresponding screwthreaded portion will represent only the amplitude of an additional ½ pitch, corresponding to a rotation of 180°. So that dust or grit cannot enter upon the surfaces in contact, and hence wear of the said surfaces will be diminished; the surfaces will be thus enabled to maintain their operation for a considerable time without play. It is to be further remarked that no pins are required for the maintenance of the said universal connections, and that the parts of the said device cannot become disengaged when in operation. No accidents can therefore happen with the said arrangement.

I claim:

In a steering arrangement for motor vehicles, the combination of a shaft with a hand wheel, a speed reduction gear controlled by said steering shaft, and transmission means between the said speed reduction gear and the steering wheels of the vehicle, this speed reduction gear comprising a small disc keyed to the steering shaft, tapered nibs arranged upon the said disc and spaced at regular intervals about a circumference, a large disc adapted to be connected with the said transmission means, this large disc being movable axially and occupying an eccentric position relative to the first one and being provided with radial slots of a trapezoidal section corresponding in number to that of the tapered nibs, the latter being adapted to enter and slide in these slots, and means adapted to press the said discs the one against the other.

In testimony that I claim the foregoing as my invention.

THÉODORE LAFITTE.